United States Patent
Abe et al.

(10) Patent No.: US 6,791,823 B2
(45) Date of Patent: Sep. 14, 2004

(54) ELECTROLYSIS SOLUTION FOR ELECTROLYTIC CAPACITORS

(75) Inventors: Koji Abe, Yamaguchi (JP); Yasuo Matsumori, Yamaguchi (JP); Motoki Yuguchi, Yamaguchi (JP); Akikazu Ito, Yamaguchi (JP); Toshikazu Hamamoto, Yamaguchi (JP); Yoshihiro Ushigoe, Yamaguchi (JP)

(73) Assignee: UBE Industries, Ltd, Yamaguchi (JP)

( * ) Notice: Subject to any disclaimer, the term of this patent is extended or adjusted under 35 U.S.C. 154(b) by 0 days.

(21) Appl. No.: 10/466,342

(22) PCT Filed: Jan. 15, 2002

(86) PCT No.: PCT/JP02/00198

§ 371 (c)(1),
(2), (4) Date: Jul. 15, 2003

(87) PCT Pub. No.: WO02/056324

PCT Pub. Date: Jul. 18, 2002

(65) Prior Publication Data

US 2004/0061991 A1 Apr. 1, 2004

(30) Foreign Application Priority Data

| Jan. 5, 2001 | (JP) | ..................... 2001-006204 |
| Jul. 12, 2001 | (JP) | ..................... 2001-211729 |
| Jul. 13, 2001 | (JP) | ..................... 2001-213227 |
| Jul. 19, 2001 | (JP) | ..................... 2001-219525 |
| Aug. 3, 2001 | (JP) | ..................... 2001-235865 |
| Sep. 5, 2001 | (JP) | ..................... 2001-268524 |

(51) Int. Cl.$^7$ ............................................. H01G 9/02
(52) U.S. Cl. .................... 361/525; 361/523; 361/528; 361/508; 361/509; 361/516
(58) Field of Search .................................. 361/525, 523, 361/528, 514, 516, 512, 508, 509, 502, 504, 510–511, 503, 506; 24/25.03; 252/62.2

(56) References Cited

U.S. PATENT DOCUMENTS

| 5,631,100 A | * | 5/1997 | Yoshino et al. ............... 429/62 |
| 6,288,889 B1 | * | 9/2001 | Komatsu et al. ............ 361/511 |
| 6,349,028 B1 | * | 2/2002 | Komatsu .................... 361/504 |
| 6,426,164 B1 | * | 7/2002 | Yamaura et al. ......... 429/231.6 |

* cited by examiner

Primary Examiner—Dean A. Reichard
Assistant Examiner—Nguyen T. Ha
(74) Attorney, Agent, or Firm—Nixon Peabody LLP; Jeffrey L. Costellia

(57) ABSTRACT

An electrolysis solution for electrolytic capacitors including an aqueous organic solvent consisting of water and a water-compatible organic solvent and 1,6-decane-dicarboxylic acid or salt thereof dissolved therein. The solution further contains one or more additives selected from dinitriles, pivalic acid and salts thereof, diesters, alkylated lactones, cyanoalkanoic esters, monocarbboxylic acids each having a $C_{3-7}$ alkyl chain and substituted with two $C_{1-4}$ alkyl groups at the β-position to the carboxyl group and salts thereof, monocarboxylic acids each having $C_{3-7}$ alkyl chain and substituted with one ethyl group at the α-position to the carboxyl group and salts thereof, and monocarboxylic acids derived from cyclic saturated compounds each having five or six ring-constituting carbon atoms and salts thereof. When one or more compounds selected from among dinitriles, diesters, alkylated lactones and cyanoalkanoic esters are used as the additives, the 1,6-decanedicarboxylic acid may be replaced by other carboxylic acid.

28 Claims, No Drawings

ELECTROLYSIS SOLUTION FOR ELECTROLYTIC CAPACITORS

FIELD OF INVENTION

The present invention relates to an electrolytic solution for electrolytic capacitors, that is, an electrolytic solution for driving electrolytic capacitors. Specifically, the invention relates to an electrolytic solution composition which is favorably employable as an electrolytic solution for driving medium-to-high pressure aluminum electrolytic capacitors.

BACKGROUND OF INVENTION

As the electrolytic solution for driving medium-to-high pressure aluminum electrolytic capacitors, heretofore has been widely employed an electrolytic solution comprising an aqueous organic solvent comprising ethylene glycol and a small amount of water and boric acid or ammonium borate (solute) dissolved therein, because this electrolytic solution shows a high spark voltage (namely, good resistance to a high voltage). However, since the electrolytic solution having such composition produces an excessive amount of water by the esterification reaction of ethylene glycol with boric acid, thus produced water is undesirabley apt to react with an aluminum oxide film of the electrode resulting in deterioration of the film or causes undesired increase of the inner pressure due to evaporation of water at a high temperature of higher than 100° C. Therefore, the electrolytic solution of this type is not suitably employed at an elevated temperature.

In order to solve the above-mentioned problems, an electrolytic solution employing an organic dicarboxylic acid such as adipic acid, sebacic acid, or azelaic acid or a salt thereof in place of boric acid or ammonium borate has been proposed and employed in practice. It is problem, however, that the solubility of the organic dicarboxylic acid in an aqueous organic solvent is low and therefore the resulting solution sometimes gives precipitation of crystals at a low temperature. Accordingly, the low temperature performances of the capacitor lowers, and it is not suitably employed at a low temperature.

JP-A-60-13293 describes an electrolytic solution for electrolytic capacitors which contains, as the solute, butyloctane diacid (i.e., 1,6-decanedicarboxylic acid) or a salt thereof. This patent publication describes that the electrolytic solution containing 1,6-decanedicarboxylic acid or a salt thereof shows a high spark voltage as well as a high electroconductivity and further a high solubility, and that the problem of the precipitation of crystals at a low temperature is solved.

JP-A-61-116815 describes an electrolytic solution for electrolytic capacitors which contains as the solute a tertiary monocarboxylic acid (such as pivalic acid) or a salt thereof. This patent publication further states that the use of the tertiary monocarboxylic acid or a salt thereof is effective to reduce an internal resistance of an electrolytic capacitor, increase resistance to a high voltage, and enlarge the range in which the capacitor can be employed.

JP-A-62-241322 describes an electrolytic solution for electrolytic capacitors having improved temperature characteristics which comprises a solution comprising ethylene glycol and a solute of a monocarboxylic acid having a total carbon atoms of 4 to 8 and an alkyl side chain (such as isobutyric acid or pivalic acid) or a salt thereof.

JP-A-6-275472 describes that an electrolytic solution comprising a solution which comprises ethylene glycol and a solute combination of a tertiary monocarboxylic acid such as pivalic acid and a secondary dicarboxylic acid such as 2,9-dimethylsebacic acid shows a high spark voltage and a high electroconductivity and further is chemically converted readily.

JP-A-6-302475 describes that an electrolytic solution comprising a solution which comprises ethylene glycol and a solute combination of a tertiary monocarboxylic acid such as pivalic acid and a secondary polycarboxylic acid such as 2,9-dimethylsebacic acid shows a high spark voltage and a high electroconductivity and further is chemically converted readily.

Recently, various electronic apparatuses employing a switching power supply are generally utilized as home appliances. Therefore, an electrolytic capacitor to be employed for the electronic apparatuses is desired to show increased safety. In order to increase safety of electrolytic capacitors, it is necessary to further enhance a spark voltage (resistance to a high voltage) of the electrolytic solution. The conventionally employed electrolytic capacitors cannot satisfy the requirement for enhancement of a spark voltage.

Accordingly, a principle object of the invention is to provide an electrolytic solution for electrolytic capacitors which shows performances at a practically satisfactory level in the electroconductivity and easiness of chemical conversion (in the procedure for producing an insulating oxide film on a metal element such as aluminum foil which is used as a positive electrode of electrolytic capacitors) and further shows a high voltage endurance at a voltage higher than that at which the conventional electrolytic solution endures.

DISCLOSURE OF INVENTION

The present invention resides in an electrolytic solution comprising water and a water-miscible organic solvent, which further contains 1,6-decanedicarboxylic acid or a salt thereof and at least one additive selected from the group consisting of a dinitrile compound, pivalic acid or a salt thereof, a diester compound, a lactone compound having an alkyl group, a cyanoalkanoic acid ester, a monocarboxylic acid having an alkyl chain of 3–7 carbon atoms and two alkyl groups of 1–4 carbon atoms at the β-position of the carboxyl group, a salt thereof, a monocarboxylic acid having an alkyl chain of 3–7 carbon atoms and one ethyl group at the α-position of the carboxyl group, a salt thereof, a monocarboxylic acid of a cyclic saturated compound having 5 or 6 ring-forming carbon atoms, and a salt thereof.

The invention further resides in an electrolytic solution comprising water and a water-miscible organic solvent, which further contains a carboxylic acid or a salt thereof and at least one additive selected from the group consisting of a dinitrile compound, a diester compound, a lactone compound having an alkyl group, and a cyanoalkanoic acid ester.

The invention furthermore resides in an electrolytic capacitor comprising a metallic element having an oxide film on a surface thereof and an electrolytic solution in a sealed case, wherein the electrolytic solution is one of the above-mentioned electrolytic solution of the invention. A preferred metallic element is an aluminum foil.

The electrolytic capacitors employing the electrolytic solution of the invention show easy chemical conversion and electroconductivity similar to those shown by the conventionally used electrolytic capacitors of the same type, while show a high spark voltage (endurable voltage) such as 470 V or higher, further 480 V or higher or 490 V or higher by choosing a preferred combination of the additives to be incorporated into the electrolytic solution. Moreover, a high spark voltage of 500 V or higher can be attained.

DETAILED DESCRIPTION OF INVENTION

The electrolytic solution of the invention is characterized in that 1,6-decanedicarboxylic acid or a salt thereof as a first additive and one or more second additives are dissolved in an aqueous organic solvent comprising water and a water-miscible organic solvent.

First, the water-miscible organic solvent which is employed as an organic solvent of the electrolytic solution of the invention is described.

The conventional electrolytic solution for electrolytic capacitors uses a combination of water and an aqueous organic solvent (i.e., water-containing organic solvent). In the present invention, various known water-miscible organic solvents can be utilized. Examples of the water-miscible organic solvents include alcohols such as polyhydric alcohols and monoalcohols, diesters, cyanoalkanoic acid esters, lactones, and sulfoxides such as dimethylsulfoxide. The organic solvent can be a mixture of two or more organic solvents. A water-immiscible organic solvent can be used in mixture of the water-miscible organic solvent, provided the resulting mixture is miscible with water.

Examples of the polyhydric alcohols include ethylene glycol, diethylene glycol, propylene glycol, dipropylene glycol, 1,3-propanediol, 1,2-butanediol, 1,3-butanediol, 2,3-butanediol, 1,5-pentanediol, 2-methyl-1,3-propanediol, 2,2-dimethyl-1,3-propanediol, pinacol, 2-methyl-2,4-pentanediol, 2-ethyl-1,3-hexanediol, 3-methyl-1,5 pentanediol, glycerol, 1,2,4-butanetriol, trimethylolethane, mannitol, sorbitol, dulcitol, and poly(vinyl alcohol).

Examples of the monoalcohols include 2-methoxyethanol, 2-ethoxyethanol, 2-propoxyethanol, 2-isopropoxyethanol, 2-butoxyethanol, 3-methyl-3-methoxy-1-butanol, 3-methoxy-1-butanol, 1-methoxy-2-propanol, 1-ethoxy-2-propanol, and 1-methoxy-2-butanol.

Examples of the lactones include γ-butyrolactone, δ-valerolactone, and ε-caprolactone.

Particularly preferred are ethylene glycol and a mixture of ethylene glycol and lactone.

The water content in the aqueous organic solvent generally is 5 wt. % or less, preferably not less than 0.1 wt. % and not more than 4 wt. % in terms of the water content in the electrolytic solution.

The first additive for the electrolytic solution of the invention is 1,6-decanedicarboxylic acid or its salts (a salt with an organic base such as ammonium salt, methylamine salt, dimethylamine salt, trimethylamine salt, ethylamine salt, diethylamine salt, triethylamine salt, or a quaternary ammonium salt). The electrolytic solution of the invention preferably has a pH value in the range of 5 to 7, particularly in the vicinity of 6. The desired pH value can be achieved by adjusting a ratio of 1,6-decanedicarboxylic acid and a salt thereof or employing a salt of 1,6-decanedicarboxylic acid alone.

According to the study conducted by the inventors, it has been found that a commercially available 1,6-decanedicarboxylic acid and salts thereof contains as impurities 1,10-decanedicarboxylic acid or salts thereof which are produced in the manufacture of 1,6-decanedicarboxylic acid and their salts. Since 1,10-decanedicarboxylic acid has a high melting point of 130° C. (melting point of 1,6-decanedicarboxylic acid is 65° C.), a mixture containing a large amount of 1,10-decancedicarboxylic acid easily precipitates at a low temperature and lowers the capacitor performance at a low temperature. Further, it easily causes transesterification with ethylene glycol in the electrolytic solution and further causes deterioration of electroconductivity at a high temperature, and hence causes lowering of the capacitor performance. Therefore, the amount of 1,10-decanedicarboxylic acid or a salt thereof contained in 1,6-decanedicarboxylic acid or a salt thereof preferably is 3 wt. % or less, more preferably 1 wt. % or less, based on the amount of 1,6-decanedicarboxylic acid or a salt thereof.

It is difficult to completely remove 1,10-decanedicarboxylic acid and/or a salt thereof, namely impurities, from the commercially available 1,6-decanedicarboxylic acid or a salt thereof. The purification by a generally performed crystallization can give 1,6-decanedicarboxylic acid or a salt thereof containing approx. 5 to 8 wt. % of 1,10-decanedicarboxylic acid and/or a salt thereof.

Accordingly, the content of 1,10-decanedicarboxylic acid and/or a salt thereof (impurities) are preferably reduced by the following purification method.

A distillation method which comprises steps of esterification of 1,10-decanedicarboxylic acid and 1,6-decanedicarboxylic acid, separating the resulting 1,6-decanedicarboxylic acid ester by distillation, and subjecting the distilled ester to hydrolysis to convert it into a carboxylic acid is preferred. The distillation is preferably carried out under the condition of a reflux ratio of 0.01 to 100, more preferably 0.1 to 30. The theoretical plate number preferably is 2 to 90, more preferably 5 to 50. The distillation can be performed at a reduced pressure or an atmospheric pressure, but preferably at a pressure 0.1 to 200 mmHg, more preferably 0.5 to 30 mmHg. The ester can be methyl ester, ethyl ester, propyl ester (linear or branched), or butyl ester (linear or branched). The distillation method is further advantageous in that generally existing low molecular weight (low boiling-point) impurities of 1,6-decanedicarboxylic acid such as butyric acid and hexanoic acid can be simultaneously removed.

The 1,6-decanedicarboxylic acid or a salt thereof is preferably present in the electrolytic solution in an amount of 0.1 to 50 wt. % so that good electroconductivity and voltage endurance can be attained. More preferred is 1 to 40 wt. %, most preferred is 1 to 20 wt. %, particularly 1 to 15 wt. % and further 3 to 10 wt. %.

If the second additive is a dinitrile compound, a diester compound, a lactone compound having an alkyl group, or a cyanoalkanoic ester compound, the first additive can be a known carboxylic acid or a salt thereof in place of 1,6-decanedicarboxylic acid or a salt thereof. The known carboxylic acid or a salt thereof can be chosen from those known as additives for electrolytic solutions for electrolytic capacitors. Examples are as follows:

5,6-decanedicarboxylic acid, sebacic acid, adipic acid, 3-dodecyladipic acid, 2,9-sebacic acid, azelaic acid, 1,7-octanedicarboxylic acid, benzoic acid, 3,3-dimethylbutanoic acid, 2,2-diisopropylpropanoic acid, 2-methylnonane diacid, 2,4-dimethyl-4-methoxycarbonylundecane diacid, 2,4,6-trimethyl-4,6-dimethoxycarbonyltridecane diacid, 8,9-dimethyl-8,9-dimethoxycarbonylhexadecane diacid, 11-cyanoundecanoic acid, 7-cyanoundecanoic acid, 2-butyl-7-cyanoheptanoic acid; salts with organic base such as ammonium salt, methylamine salt, dimethylamine salt, trimethylamine salt, ethylamine salt, diethylamine salt, triethylamine salt, and tertiary ammonium ssalt of the above-mentioned carboxylic acids.

The above-mentioned carboxylic acid or a salt thereof is preferably contained in the electrolytic solution in an amount of 0.1 to 50 wt. %, more preferably 1 to 40 wt. %, most preferably 1 to 20 wt. % (particularly 1 to 15 wt. %), so that good electroconductivity and voltage endurance can be attained.

The second additive to be added to the electrolytic solution of the invention is one of the below-mentioned compounds. One or more additives can be dissolved in the electrolytic solution:

a dinitrile compound, pivalic acid or a salt thereof, a diester compound, a lactone compound having an alkyl group, a cyanoalkanoic acid ester, a monocarboxylic acid having an alkyl chain of 3—7 carbon atoms and two alkyl groups of 1–4 carbon atoms at the β-position of the carboxyl group, a salt thereof, a monocarboxylic acid having an alkyl chain of 3–7 carbon atoms and one ethyl group at the α-position of the carboxyl group, a salt thereof, a monocarboxylic acid of a cyclic saturated compound having 5 or 6 ring-forming carbon atoms, and a salt thereof.

Details of the second additives are described below.

Dinitrile Compound

As the dinitrile compound, preferred is a dinitrile compound comprising an alkylene chain of 1 to 12 carbon atoms to which two nitrile groups are attached. The alkylene chain can be branched or linear. Examples of the dinitrile compounds include linear dinitriles such as succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, and 1,12-dicyanododecane and branched dinitriles such as tetramethylsuccinonitrile, 2-methylglutaronitrile, 2,4-dimethylglutaronitrile, 2,2,4,4-tetramethylglutaronitrile, 1,4-dicyanopentane, 2,5-dimethyl-2,5-hexanedicarbonitrile, 2,6-dicyanoheptane, 2,7-dicyanooctane, 2,8-dicyanononane, and 1,6-dicyanodecane. Most preferred is adiponitrile.

The nitrile compound is preferably contained in the electrolytic solution in an amount of 0.1 to 50 wt. %, more preferably 1 to 40 wt. %, further preferably 1 to 20 wt. %, based on the total amount of the electrolytic solution.

Pivalic Acid or a Salt Thereof

The pivalic acid is also named trimethylacetic acid which is represented by the formula of $(CH_3)_3COOH$. A salt thereof (pivalic acid salt) can be a salt with the aforementioned organic base.

The pivalic acid or a salt thereof is preferably contained in the electrolytic solution in an amount of 1 to 20 wt. %, more preferably 3 to 15 wt. %, based on the total amount of the electrolytic solution.

A ratio of pivalic acid (or a salt thereof):1,6-decanedicarboxylic acid (or a salt thereof, first additive) preferably is in the range of 25:75 to 90:10, by weight. The total amount of pivalic acid (or a salt thereof) and 1,6-decanedicarboxylic acid (or a salt thereof) preferably is in the range of 2 to 30 wt. %, particularly 6 to 25 wt. %, based on the total amount of the electrolytic solution.

It is preferred that pivalic acid or a salt thereof is contained in the electrolytic solution in combination with the aforementioned nitrile compound.

Diester Compound

The diester compound preferably is a diester compound having an alkylene group of 2–18 carbon atoms (particularly 4–12 carbon atoms). The alkylene group can be linear or branched. Examples of the diester compounds include linear esters such as dimethyl succinate, dimethyl glutarate, dimethyl adipate, dimethyl pimelate, dimethyl suberate, dimethyl azelate, dimethyl sebacate, dimethyl decanedicarboxylate, and dimethyl 1,10-decanedicarboxylate and branched esters such as dimethyl tetramethylsuccinate, dimethyl 2-methylglutarate, dimethyl 2,4-dimethylglutarate, dimethyl 2,2,4,4-tetramethyl-4-dimethylglutarate, and dimethyl 1,6-decanedicarboxylate. The diester compounds are not limited to methyl esters having methyl groups at both terminals, and the diester compounds can be ethyl ester, propyl ester, or phenyl ester.

The diester compound is generally contained in the electrolytic solution in an amount of 0.01 to 50 wt. %, preferably 0.1 to 40 wt. %, more preferably 1 to 20 wt. %, based on the total amount of the electrolytic solution.

In the case that the above-mentioned diester compound is incorporated into the electrolytic solution, 1 to 20 wt. % of pivalic acid or a salt thereof is preferably added.

Lactone Compound Having an Alkyl Group

As the lactone compound having an alkyl group, preferred are lactone compounds having alkyl group of 1 to 12 carbon atoms such as methyl, ethyl, propyl, butyl, pentyl, hexyl, heptyl or octyl. The alkyl group can be a branched alkyl group such as isopropyl or isobutyl. More preferred are lactone compounds having an alkyl group of 4–8 carbon atoms.

Examples of the preferred lactone compounds include γ-nonanolactone having one linear pentyl and γ-undecanolactone having one linear heptyl. A δ-lactone compound and an ε-lactone compound can be also employed.

The lactone compound is generally contained in the electrolytic solution in an amount of 0.1 to 50 wt. %, preferably 1 to 20 wt. %, more preferably 1 to 10 wt. %, based on the total amount of the electrolytic solution.

Cyanoalkanoic Acid Ester Compound

The cyanoalkanoic acid ester compound preferably has an alkylene group of 2–18 carbon atoms (particularly 4–12 carbon atoms). The alkylene group can be linear or branched.

Examples of the cyanoalkanoic acid ester compounds include linear compounds such as methyl 3-cyanopropanoate, methyl 4-cyanobutanoate, methyl 5-cyanopentanoate, methyl 6-cyanohexanoate, methyl 7-cyanoheptanoate, methyl 8-cyanooctanoate, methyl 9-cyanononanoate, methyl 10-cyanodecanoate, methyl 11-cyanoundecanoate, and methyl 12-cyanododecanoate, and branched compounds such as methyl 7-cyanoundecanoate and methyl 2-butyl-7-cyanoheptanoate. The ester is not limited to the methyl ester, and ethyl ester, propyl ester and phenyl ester can be also employed.

The cyanoalkanoic acid ester compound is generally contained in the electrolytic solution in an amount of 0.01 to 50 wt. %, preferably 0.1 to 40 wt. %, more preferably 1 to 20 wt. %, based on the total amount of the electrolytic solution.

[Monocarboxylic acid having an alkyl chain of 3–7 carbon atoms and two alkyl groups of 1–4 carbon atoms at the β-position of the carboxyl group and salts thereof]

This monocarboxylic acid is a compound having the formula of $(R^1)(R^2)(R^3)CH_2COOH$ [each of $R^1$, $R^2$, and $R^3$ independently is an alkyl group having 1 to 4 carbon atoms].

Each of $R^1$, $R^2$, and $R^3$ of the monocarboxylic acid represented by the above-mentioned formula independently is an alkyl group having 1 to 4 carbon atoms such as methyl, ethyl, n-propyl, isopropyl, n-butyl, sec-butyl, or tert-butyl. Methyl or ethyl is preferred.

Examples of the monocarboxylic acids of the above-mentioned formula include 3,3-dimethylbutanoic acid ($R^1=R^2=R^3$=methyl), 3,3-dimethylpentanoic acid ($R^1=R^2$=methyl, $R^3$=ethyl), 3,3-diethylbutanoic acid ($R^1=R^2$=ethyl, $R^3$=methyl), 3,3-diethylpentanoic acid ($R^1=R^2=R^3$=ethyl), and 3,3,4-trimethylpentanoic acid ($R^1=R^2$=methyl, $R^3$=isopropyl). Examples of salts of the monocarboxylic acids are salts of the aforementioned organic bases.

The above-mentioned monocarboxylic acid or a salt thereof is generally contained in the electrolytic solution in an amount of 0.1 to 50 wt. %, preferably 1 to 40 wt. %, more preferably 1 to 20 wt. %, based on the total amount of the electrolytic solution.

Monocarboxylic acid having an alkyl chain of 3–7 Carbon atoms and one ethyl group at the α-position of the carboxyl group, and salts thereof]

Examples of the monocarboxylic acids include 2-ethylbutanoic acid, 2-ethylpentanoic acid, 2-ethylhexanoic acid, and 2-ethylheptanoic acid. Examples of salts of the monocarboxylic acids are salts of the aforementioned organic bases.

The above-mentioned monocarboxylic acid or a salt thereof is generally contained in the electrolytic solution in an amount of 0.1 to 50 wt. %, preferably 1 to 40 wt. %, more preferably 1 to 20 wt. %, based on the total amount of the electrolytic solution.

[Monocarboxylic acid of a cyclic saturated compound having 5 or 6 ring-forming carbon atoms, and salts thereof]

Examples of the monocarboxylic acids include cyclopentanecarboxylic acid and cyclohexanecarboxylic acid. Examples of salts of the monocarboxylic acids are salts of the aforementioned organic bases.

The above-mentioned monocarboxylic acid or a salt thereof is generally contained in the electrolytic solution in an amount of 0.1 to 50 wt. %, preferably 1 to 40 wt. %, more preferably 1 to 20 wt. %, based on the total amount of the electrolytic solution.

Optionally Employable Other Additives

Into an electrolytic solution for electrolytic capacitors according to the invention, one or more of acidic alkyl phosphate esters, phosphoric acid, and phosphorous acid which can inhibit hydrolytic deterioration of an anode oxide film (which occurs in a long term storage of a capacitor) and increase of leakage current of a capacitor can be incorporated. The acidic alkyl phosphate esters, phosphoric acid, or phosphorous acid can be incorporated into the electrolytic solution in an amount of 0.02 to 4 wt. %, based on the total amount of the electrolytic solution.

Further, one or more aromatic nitro compounds such as o-nitrophenol, m-nitrophenol, p-nitrophenol, and m-nitroacetophenone which have a function to inhibit increase of the internal pressure caused by hydrogen gas generated inside of a capacitor can be added. The amount of the aromatic nitro compound preferably in the range of 0.02 to 6 wt. %, based on the total amount of the electrolytic solution.

The present invention is further described by the following examples. In the following examples, the electrolytic solution was prepared by dissolving one or more additives in an aqueous organic solvent comprising water and ethylene glycol (or a combination of ethylene glycol and γ-butyrolactone). In the electrolytic solution was placed an aluminum foil. A constant current of a current density of 10 mA/cm$^2$ was applied to this system. Then, a spark voltage (V), a period of time to reach 400 V (working period (chemical conversion period): minutes), and an electroconductance at 20° C. (specific conductance mS/cm) were measured. The measured values are described below.

Further, electrolytic solutions having a known representative composition were also subjected to the same measurement. The measured values are also described below.

COMPARISON EXAMPLE 1

Ammonium 1,6-decanedicarboxylate (15 wt. %)
Ethylene glycol (82 wt. %)
Water (3 wt. %)
  Spark voltage: 430 V
  Working period: 4.8 minutes
  Electroconductance: 2.1 mS/cm

COMPARISON EXAMPLE 2

Ammonium pivalate (15 wt. %)
Ethylene glycol (82 wt. %)
Water (3 wt. %)
  Spark voltage: 440 V
  Working period: 5.6 minutes
  Electroconductance: 2.2 mS/cm

EXAMPLE 1

Ammonium 1,6-decanedicarboxylate (5 wt. %)
Ammonium pivalate (10 wt. %)
Ethylene glycol (82 wt. %)
Water (3 wt. %)
   Spark voltage: 475 V
   Working period: 5.4 minutes
   Electroconductance: 1.7 mS/cm

EXAMPLE 2

Ammonium 1,6-decanedicarboxylate (5 wt. %)
Ammonium pivalate (10 wt. %)
Ethylene glycol (52 wt. %)
Adiponitrile (30 wt. %)
Water (3 wt. %)
   Spark voltage: 520 V
   Working period: 5.6 minutes
   Electroconductance: 1.6 mS/cm

EXAMPLE 3

Ammonium 1,6-decanedicarboxylate (5 wt. %)
Ammonium pivalate (10 wt. %)
Ethylene glycol (81 wt. %)
Adiponitrile (1 wt. %)
Water (3 wt. %)
   Spark voltage: 480 V
   Working period: 5.2 minutes
   Electroconductance: 1.7 mS/cm

EXAMPLE 4

Ammonium 1,6-decanedicarboxylate (5 wt. %)
Ammonium pivalate (10 wt. %)
Ethylene glycol (72 wt. %)
Adiponitrile (10 wt. %)
Water (3 wt. %)
   Spark voltage: 510 V
   Working period: 5.4 minutes
   Electroconductance: 1.7 mS/cm

EXAMPLE 5

Ammonium 1,6-decanedicarboxylate (7.5 wt. %)
Ammonium pivalate (7.5 wt. %)
Ethylene glycol (72 wt. %)
Adiponitrile (10 wt. %)
Water (3 wt. %)
   Spark voltage: 495 V
   Working period: 5.1 minutes
   Electroconductance: 1.7 mS/cm

EXAMPLE 6

Ammonium 1,6-decanedicarboxylate (10 wt. %)
Ammonium pivalate (5 wt. %)
Ethylene glycol (72 wt. %)
Adiponitrile (10 wt. %)
Water (3 wt. %)
   Spark voltage: 480 V
   Working period: 4.8 minutes
   Electroconductance: 1.7 mS/cm

EXAMPLE 7

Ammonium 1,6-decanedicarboxylate (5 wt. %)
Ammonium pivalate (10 wt. %)
Ethylene glycol (60 wt. %)
1,5-Pentanediol (12 wt. %)
Adiponitrile (10 wt. %)
Water (3 wt. %)
   Spark voltage: 500 V
   Working period: 5.6 minutes
   Electroconductance: 1.4 mS/cm

EXAMPLE 8

Ammonium 1,6-decanedicarboxylate (5 wt. %)
Ammonium pivalate (10 wt. %)
Ethylene glycol (60 wt. %)
1,2,4-Butanetriol (12 wt. %)
Adiponitrile (10 wt. %)
Water (3 wt. %)
   Spark voltage: 500 V
   Working period: 5.4 minutes
   Electroconductance: 1.3 mS/cm

EXAMPLE 9

Ammonium 1,6-decanedicarboxylate (5 wt. %)
Ammonium pivalate (10 wt. %)
Ethylene glycol (60 wt. %)
1,2-Butanediol (12 wt. %)
1,6-Dicyanodecane (10 wt. %)
Water (3 wt. %)
   Spark voltage: 495 V
   Working period: 5.5 minutes
   Electroconductance: 1.5 mS/cm

EXAMPLE 10

Ammonium 1,6-decanedicarboxylate (5 wt. %)
Ammonium pivalate (10 wt. %)
Ethylene glycol (60 wt. %)
Diethylene glycol (12 wt. %)
1,6-Dicyanodecane (10 wt. %)
Water (3 wt. %)
   Spark voltage: 510 V
   Working period: 5.4 minutes
   Electroconductance: 1.3 mS/cm

EXAMPLE 11

Ammonium 1,6-decanedicarboxylate (5 wt. %)
Ammonium pivalate (10 wt. %)
Ethylene glycol (60 wt. %)
Pinacol (12 wt. %)
Adiponitrile (10 wt. %)
Water (3 wt. %)
   Spark voltage: 515 V
   Working period: 6.2 minutes
   Electroconductance: 1.1 mS/cm

EXAMPLE 12

Ammonium 1,6-decanedicarboxylate (2.5 wt. %)
Ammonium pivalate (7.5 wt. %)
Ethylene glycol (70 wt. %)
Adiponitrile (17 wt. %)
Water (3 wt. %)
  Spark voltage: 560 V
  Working period: 6.1 minutes
  Electroconductance: 0.8 mS/cm

EXAMPLE 13

Ammonium 1,6-decanedicarboxylate (2.5 wt. %)
Ammonium pivalate (7.5 wt. %)
Ethylene glycol (22 wt. %)
γ-Butyrolactone (50 wt. %)
Adiponitrile (15 wt. %)
Water (3 wt. %)
  Spark voltage: 560 V
  Working period: 6.0 minutes
  Electroconductance: 0.9 mS/cm

EXAMPLE 14

Ammonium 1,6-decanedicarboxylate (10 wt. %)
Ethylene glycol (73 wt. %)
Adiponitrile (15 wt. %)
Water (2 wt. %)
  Spark voltage: 500 V
  Working period: 4.6 minutes
  Electroconductance: 1.4 mS/cm

EXAMPLE 15

Ammonium pivalate (10 wt. %)
Ethylene glycol (73 wt. %)
Adiponitrile (15 wt. %)
Water (2 wt. %)
  Spark voltage: 510 V
  Working period: 5.4 minutes
  Electroconductance: 2.0 mS/cm Comparisons between the results of Examples 1 to 15 and the results of Comparison Examples 1 to 2 indicate that the electrolytic solutions containing additives of ammonium 1,6-decanedicarboxylate (or ammonium pivalate) and a nitrile compound according to the invention give an apparently high spark voltage as compared with the electrolytic solutions containing an additive of ammonium 1,6-decanedicarboxylate alone, while almost no changes are observed on the working period and electroconductivity. Similar results are also observed in the electrolytic solution containing additives of ammonium 1,6-decanedicarboxylate and ammonium pivalate in combination.

The following examples show the results measured on the performances of the electrolytic solution to indicate the difference between the case using a commercially available ammonium 1,6-decanedicarboxylate for industrial use (containing 6 wt. % of ammonium 1,10-decanedicarboxylate as impurities) and the case using a high purity ammonium 1,6-decanedicarboxylate (containing 0.1 wt. % of ammonium 1,10-decanedicarboxylate). A high purity 1,6-decanedicarboxylic acid for the high purity ammonium 1,6-decanedicarboxylate was prepared by the following method.

Preparation of High Purity 1,6-Decanedicarboxylic Acid 1,6-Decanedicarboxylic acid obtained as that for industrial use (containing 6 wt. % of 1,10-decanedicarboxylic acid as impurities) was converted into its methyl ester. The methyl ester product was subjected to rectification under the conditions of a reflux ratio of 1 and a theoretical plate number of 20 to separate methyl 1,10-decanedicarboxylate (b.p.: 165° C./10 mmHg) from methyl 1,6-decanedicarboxylate (b.p.: 156° C./10 mmHg). Subsequently, methyl 1,6-decanedicarboxylate was hydrolyzed to obtain the high purity 1,6-decanedicarboxylic acid (containing 0.1 wt. % of 1,10-decanedicarboxylic acid).

In the following examples, the electrolytic solution was prepared by dissolving one or more additives in an aqueous organic solvent comprising water and ethylene glycol. In the electrolytic solution was placed an aluminum foil. A constant current of a current density of 10 mA/cm$^2$ was applied to this system. Then, the spark voltage (V), a period of time to reach 400 V (working period: minutes), and an electroconductance at 20° C. (specific conductance) were measured. Further, a ratio (%) of decrease of electroconductance after keeping the electrolytic solution at 105° C. for 720 hours was measured.

The measured values are described below.

COMPARISON EXAMPLE 3

Ammonium 1,6-decanedicarboxylate (for industrial use, 15 wt. %)
Ethylene glycol (82 wt. %)
Water (3 wt. %)
  Spark voltage: 430 V
  Working period: 4.8 minutes
  Electroconductance: 2.1 mS/cm
  Ratio of decrease of conductance: 31%

EXAMPLE 16

Ammonium 1,6-decanedicarboxylate (for industrial use, 5 wt. %)
Ammonium pivalate (10 wt. %)
Ethylene glycol (82 wt. %)
Water (3 wt. %)
  Spark voltage: 475 V
  Working period: 5.4 minutes
  Electroconductance: 1.7 mS/cm
  Ratio of decrease of conductance: 18%

EXAMPLE 17

Ammonium 1,6-decanedicarboxylate (high purity, 5 wt. %)
Ammonium pivalate (10 wt. %)
Ethylene glycol (82 wt. %)
Water (3 wt. %)
  Spark voltage: 480 V
  Working period: 5.3 minutes
  Electroconductance: 1.7 mS/cm
  Ratio of decrease of conductance: 17%

EXAMPLE 18

Ammonium 1,6-decanedicarboxylate (for industrial use, 7.5 wt. %)
Ammonium pivalate (7.5 wt. %)
Ethylene glycol (82 wt. %)
Water (3 wt. %)
  Spark voltage: 480 V
  Working period: 5.0 minutes
  Electroconductance: 1.8 mS/cm
  Ratio of decrease of conductance: 21%

EXAMPLE 19

Ammonium 1,6-decanedicarboxylate (high purity, 7.5 wt. %)
Ammonium pivalate (7.5 wt. %)
Ethylene glycol (82 wt. %)
Water (3 wt. %)
  Spark voltage: 485 V
  Working period: 4.9 minutes
  Electroconductance: 1.8 mS/cm
  Ratio of decrease of conductance: 19%

EXAMPLE 20

Ammonium 1,6-decanedicarboxylate (for industrial use, 10 wt. %)
Ammonium pivalate (5 wt. %)
Ethylene glycol (82 wt. %)
Water (3 wt. %)
  Spark voltage: 470 V
  Working period: 4.7 minutes
  Electroconductance: 1.7 mS/cm
  Ratio of decrease of conductance: 26%

EXAMPLE 21

Ammonium 1,6-decanedicarboxylate (high purity, 10 wt. %)
Ammonium pivalate (5 wt. %)
Ethylene glycol (82 wt. %)
Water (3 wt. %)
  Spark voltage: 475 V
  Working period: 4.6 minutes
  Electroconductance: 1.8 mS/cm
  Ratio of decrease of conductance: 22%

EXAMPLE 22

Ammonium 1,6-decanedicarboxylate (high purity, 5 wt. %)
Ammonium pivalate (10 wt. %)
Ethylene glycol (70 wt. %)
1,5-Pentanediol (12 wt. %)
Water (3 wt. %)
  Spark voltage: 475 V
  Working period: 5.3 minutes
  Electroconductance: 1.4 mS/cm
  Ratio of decrease of conductance: 17%

EXAMPLE 23

Ammonium 1,6-decanedicarboxylate (high purity, 5 wt. %)
Ammonium pivalate (10 wt. %)
Ethylene glycol (70 wt. %)
1,2,4-Butanetriol (12 wt. %)
Water (3 wt. %)
  Spark voltage: 480 V
  Working period: 4.8 minutes
  Electroconductance: 1.3 mS/cm
  Ratio of decrease of conductance: 16%

EXAMPLE 24

Ammonium 1,6-decanedicarboxylate (high purity, 5 wt. %)
Ammonium pivalate (10 wt. %)
Ethylene glycol (70 wt. %)
1,2-Butanediol (12 wt. %)
Water (3 wt. %)
  Spark voltage: 480 V
  Working period: 5.2 minutes
  Electroconductance: 1.5 mS/cm
  Ratio of decrease of conductance: 16%

EXAMPLE 25

Ammonium 1,6-decanedicarboxylate (high purity, 5 wt. %)
Ammonium pivalate (10 wt. %)
Ethylene glycol (70 wt. %)
Diethylene glycol (12 wt. %)
Water (3 wt. %)
  Spark voltage: 480 V
  Working period: 4.7 minutes
  Electroconductance: 1.5 mS/cm
  Ratio of decrease of conductance: 16%

EXAMPLE 26

Ammonium 1,6-decanedicarboxylate (high purity, 5 wt. %)
Ammonium pivalate (10 wt. %)
Ethylene glycol (70 wt. %)
Pinacol (12 wt. %)
Water (3 wt. %)
  Spark voltage: 485 V
  Working period: 5.9 minutes
  Electroconductance: 1.1 mS/cm
  Ratio of decrease of conductance: 14%

Comparisons between the results of Examples 16 to 26 and the results of Comparison Example 3 indicate that the electrolytic solutions employing a high purity ammonium 1,6-decanedicarboxylate (which is prepared by purifying ammonium 1,6-decanedicarboxylate for industrial use to decrease content of ammonium 1,10-decanedicarboxylate) give a high spark voltage and a low radio of decrease of conductance as compared with the electrolytic solution employing ammonium 1,6-decanedicarboxylate for industrial use.

In the following examples, the electrolytic solution was prepared by dissolving ammonium 1,6-decanedicarboxylate and a diester compound (or a lactone compound having an alkyl group, or a cyanoalkane compound) in an aqueous organic solvent comprising water and ethylene glycol. In the electrolytic solution was placed an aluminum foil. A constant current of a current density of 10 mA/cm² was applied to this system. Then, the spark voltage (V), a period of time to reach 400 V (working period: minutes), and an electroconductance at 20° C. (specific conductance) were measured. The measured values are described below.

COMPARISON EXAMPLE 4

Ammonium 1,6-decanedicarboxylate (10 wt. %)
Ethylene glycol (87 wt. %)
Water (3 wt. %)
    Spark voltage: 440 V
    Working period: 5.4 minutes
    Electroconductance: 1.4 mS/cm

EXAMPLE 27

Ammonium 1,6-decanedicarboxylate (10 wt. %)
Ethylene glycol (77 wt. %)
Dimethyl adipate (10 wt. %)
Water (3 wt. %)
    Spark voltage: 470 V
    Working period: 4.6 minutes
    Electroconductance: 1.4 mS/cm

EXAMPLE 28

Ammonium 1,6-decanedicarboxylate (10 wt. %)
Ethylene glycol (84 wt. %)
γ-Undecanolactone (3 wt. %)
Water (3 wt. %)
    Spark voltage: 480 V
    Working period: 4.5 minutes
    Electroconductance: 1.4 mS/cm

EXAMPLE 29

Ammonium 1,6-decanedicarboxylate (10 wt. %)
Ethylene glycol (77 wt. %)
Methyl 11-cyanoundecanoate (10 wt. %)
Water (3 wt. %)
    Spark voltage: 475 V
    Working period: 4.7 minutes
    Electroconductance: 1.3 mS/cm

EXAMPLE 30

Ammonium 1,6-decanedicarboxylate (10 wt. %)
Ethylene glycol (82 wt. %)
γ-Nonanolactone (5 wt. %)
Water (3 wt. %)
    Spark voltage: 465 V
    Working period: 4.7 minutes
    Electroconductance: 1.4 mS/cm

EXAMPLE 31

Ammonium 1,6-decanedicarboxylate (10 wt. %)
Ethylene glycol (74 wt. %)
γ-Undecanolactone (3 wt. %)
Adiponitrile (10 wt. %)
Water (3 wt. %)
    Spark voltage: 500 V
    Working period: 4.7 minutes
    Electroconductance: 1.3 mS/cm

EXAMPLE 32

Ammonium 1,6-decanedicarboxylate (5 wt. %)
Ammonium 11-cyanoundecanoate (5 wt. %)
Ethylene glycol (84 wt. %)
γ-Undecanolactone (3 wt. %)
Water (3 wt. %)
    Spark voltage: 500 V
    Working period: 8.8 minutes
    Electroconductance: 1.4 mS/cm

EXAMPLE 33

Ammonium 1,6-decanedicarboxylate (10 wt. %)
Ammonium pivalate (5 wt. %)
Ethylene glycol (79 wt. %)
γ-Undecanolactone (3 wt. %)
Water (3 wt. %)
    Spark voltage: 485 V
    Working period: 4.8 minutes
    Electroconductance: 1.6 mS/cm

EXAMPLE 34

Ammonium 1,6-decanedicarboxylate (7.5 wt. %)
Ammonium pivalate (7.5 wt. %)
Ethylene glycol (79 wt. %)
γ-Undecanolactone (3 wt. %)
Water (3 wt. %)
    Spark voltage: 500 V
    Working period: 5.1 minutes
    Electroconductance: 1.7 mS/cm

EXAMPLE 35

Ammonium 1,6-decanedicarboxylate (5 wt. %)
Ammonium pivalate (10 wt. %)
Ethylene glycol (79 wt. %)
γ-Undecanolactone (3 wt. %)
Water (3 wt. %)
    Spark voltage: 505 V
    Working period: 5.2 minutes
    Electroconductance: 1.7 mS/cm

EXAMPLE 36

Ammonium 1,6-decanedicarboxylate (5 wt. %)
Ammonium pivalate (10 wt. %)
Ethylene glycol (54 wt. %)
γ-Butyrolactone (25 wt. %)
γ-Undecanolactone (3 wt. %)
Water (3 wt. %)
    Spark voltage: 505 V
    Working period: 4.9 minutes
    Electroconductance: 1.7 mS/cm

EXAMPLE 37

Ammonium 1,6-decanedicarboxylate (5 wt. %)
Ammonium pivalate (10 wt. %)
Ethylene glycol (69 wt. %)
Methyl 11-cyanoundecanoate (10 wt. %)
γ-Undecanolactone (3 wt. %)
Water (3 wt. %)
  Spark voltage: 495 V
  Working period: 4.9 minutes
  Electroconductance: 1.6 mS/cm

EXAMPLE 38

Ammonium 1,6-decanedicarboxylate (5 wt. %)
Ammonium pivalate (10 wt. %)
Ethylene glycol (69 wt. %)
Adiponitrile (10 wt. %)
γ-Undecanolactone (3 wt. %)
Water (3 wt. %)
  Spark voltage: 510 V
  Working period: 5.0 minutes
  Electroconductance: 1.7 mS/cm

EXAMPLE 39

Ammonium 1,6-decanedicarboxylate (5 wt. %)
Ammonium 2,2-diisopropylpropanoate (10 wt. %)
Ethylene glycol (39 wt. %)
γ-Undecanolactone (3 wt. %)
γ-Butyrolactone (25 wt. %)
Adiponitrile (15 wt. %)
Water (3 wt. %)
  Spark voltage: 510 V
  Working period: 4.9 minutes
  Electroconductance: 1.8 mS/cm Comparisons between the results of Examples 27 to 39 and the results of Comparison Example 4 indicate that the electrolytic solutions containing additives of ammonium 1,6-decanedicarboxylate and a diester compound (or a lactone compound having an alkyl group or a cyanoalkane compound, optionally further a nitrile compound) according to the invention give an apparently high spark voltage as compared with the electrolytic solutions containing an additive of ammonium 1,6-decanedicarboxylate alone, while almost no changes are observed on the working period and electroconductivity.

In the following examples, the electrolytic solution was prepared by dissolving ammonium 1,6-decanedicarboxylate and a monocarboxylic acid having an alkyl chain of 3–7 carbon atoms and two alkyl groups of 1–4 carbon atoms at the β-position of the carboxyl group (or its salt) in an aqueous organic solvent comprising ethylene glycol (or a combination of ethylene glycol and γ-butyrolactone) and water. In the electrolytic solution was placed an aluminum foil. A constant current of a current density of 10 mA/cm$^2$ was applied to this system. Then, the spark voltage (V), a period of time to reach 400 V (working period: minutes), and an electroconductance at 20° C. (specific conductance) were measured. The measured values are described below.

EXAMPLE 40

Ammonium 1,6-decanedicarboxylate (7.5 wt. %)
Ammonium 3,3-dimethylbutanoate (2.5 wt. %)
Ethylene glycol (87 wt. %)
Water (3 wt. %)
  Spark voltage: 480 V
  Working period: 5.7 minutes
  Electroconductance: 1.5 mS/cm

EXAMPLE 41

Ammonium 1,6-decanedicarboxylate (5 wt. %)
Ammonium 3,3-dimethylbutanoate (5 wt. %)
Ethylene glycol (87 wt. %)
Water (3 wt. %)
  Spark voltage: 500 V
  Working period: 6.0 minutes
  Electroconductance: 1.5 mS/cm

EXAMPLE 42

Ammonium 1,6-decanedicarboxylate (2.5 wt. %)
Ammonium 3,3-dimethylbutanoate (7.5 wt. %)
Ethylene glycol (87 wt. %)
Water (3 wt. %)
  Spark voltage: 510 V
  Working period: 6.2 minutes
  Electroconductance: 1.6 mS/cm

EXAMPLE 43

Ammonium 1,6-decanedicarboxylate (2.5 wt. %)
Ammonium 3,3-dimethylbutanoate (7.5 wt. %)
Ethylene glycol (70 wt. %)
Adiponitrile (17 wt. %)
Water (3 wt. %)
  Spark voltage: 550 V
  Working period: 6.1 minutes
  Electroconductance: 1.4 mS/cm

EXAMPLE 44

Ammonium 1,6-decanedicarboxylate (2.5 wt. %)
Ammonium 3,3-dimethylbutanoate (7.5 wt. %)
Ethylene glycol (22 wt. %)
γ-Butyrolactone (50 wt. %)
Adiponitrile (15 wt. %)
Water (3 wt. %)
  Spark voltage: 560 V
  Working period: 5.8 minutes
  Electroconductance: 1.5 mS/cm

EXAMPLE 45

Ammonium 1,6-decanedicarboxylate (2.5 wt. %)
Ammonium 3,3-dimethylbutanoate (7.5 wt. %)
Ethylene glycol (17 wt. %)
γ-Butyrolactone (50 wt. %)
γ-Undecanolactone (5 wt. %)
Adiponitrile (15 wt. %)
Water (3 wt. %)
  Spark voltage: 560 V
  Working period: 5.3 minutes
  Electroconductance: 1.5 mS/cm Comparisons between the results of Examples 40 to 45 and the results of Comparison Example 4 indicate that the electrolytic solutions containing additives of ammonium 1,6-decanedicarboxylate and a monocarboxylic acid having an alkyl chain of 3–7 carbon atoms and two alkyl groups of 1–4 carbon atoms at the β-position of the carboxyl group or its salt (optionally further a nitrile compound) according to the invention give an apparently high spark voltage as compared with the electrolytic solutions containing an additive of ammonium 1,6-decanedicarboxylate alone, while almost no changes are observed on the working period and electroconductivity.

In the following examples, the electrolytic solution was prepared by dissolving ammonium 1,6-decanedicarboxylate and a monocarboxylic acid having an alkyl chain of 3–7 carbon atoms and one ethyl group at the α-position of the carboxyl group (or its salt) or a monocarboxylic acid of a cyclic saturated compound having 5 or 6 ring-forming carbon atoms (or its salt) in an aqueous organic solvent comprising ethylene glycol and water. In the electrolytic solution was placed an aluminum foil. A constant current of a current density of 10 mA/cm$^2$ was applied to this system. Then, the spark voltage (V), a period of time to reach the spark voltage (working period: minutes), and an electroconductance at 20° C. (specific conductance) were measured. The measured values are described below.

COMPARISON EXAMPLE 5

Ammonium 1,6-decanedicarboxylate (10 wt. %)
Ethylene glycol (87 wt. %)
Water (3 wt. %)
  Spark voltage: 440 V
  Working period: 5.7 minutes
  Electroconductance: 1.4 mS/cm

COMPARISON EXAMPLE 6

Ammonium 2-ethylbutanoate (10 wt. %)
Ethylene glycol (87 wt. %)
Water (3 wt. %)
  Spark voltage: 330 V
  Working period: 9.2 minutes
  Electroconductance: 1.6 mS/cm

COMPARISON EXAMPLE 7

Ammonium 2-ethylhexanoate (10 wt. %)
Ethylene glycol (87 wt. %)
Water (3 wt. %)
  Spark voltage: 355 V
  Working period: 12.2 minutes
  Electroconductance: 1.0 mS/cm

COMPARISON EXAMPLE 8

Ammonium 2-cyclopentanoate (10 wt. %)
Ethylene glycol (87 wt. %)
Water (3 wt. %)
  Spark voltage: 405 V
  Working period: 13.2 minutes
  Electroconductance: 1.6 mS/cm

COMPARISON EXAMPLE 9

Ammonium 2-cyclohexanoate (10 wt. %)
Ethylene glycol (87 wt. %)
Water (3 wt. %)
  Spark voltage: 480 V
  Working period: 18.9 minutes
  Electroconductance: 1.5 mS/cm

EXAMPLE 46

Ammonium 1,6-decanedicarboxylate (5 wt. %)
Ammonium 2-ethylbutanoate (5 wt. %)
Ethylene glycol (87 wt. %)
Water (3 wt. %)
  Spark voltage: 490 V
  Working period: 5.6 minutes
  Electroconductance: 1.4 mS/cm

EXAMPLE 47

Ammonium 1,6-decanedicarboxylate (5 wt. %)
Ammonium 2-ethylhexanoate (5 wt. %)
Ethylene glycol (87 wt. %)
Water (3 wt. %)
  Spark voltage: 520 V
  Working period: 6.5 minutes
  Electroconductance: 1.3 mS/cm

EXAMPLE 48

Ammonium 1,6-decanedicarboxylate (5 wt. %)
Ammonium cyclopentanoate (5 wt. %)
Ethylene glycol (87 wt. %)
Water (3 wt. %)
  Spark voltage: 495 V
  Working period: 6.2 minutes
  Electroconductance: 1.5 mS/cm

EXAMPLE 49

Ammonium 1,6-decanedicarboxylate (5 wt. %)
Ammonium cyclohexanoate (5 wt. %)
Ethylene glycol (87 wt. %)
Water (3 wt. %)
  Spark voltage: 495 V
  Working period: 6.0 minutes
  Electroconductance: 1.4 mS/cm

EXAMPLE 50

Ammonium 1,6-decanedicarboxylate (5 wt. %)
Ammonium 2-ethylhexanoate (5 wt. %)
Ethylene glycol (77 wt. %)
Adiponitrile (10 wt. %)
Water (3 wt. %)
  Spark voltage: 520 V
  Working period: 5.9 minutes
  Electroconductance: 1.5 mS/cm

EXAMPLE 51

Ammonium 1,6-decanedicarboxylate (5 wt. %)
Ammonium 2-ethylhexanoate (5 wt. %)
Ethylene glycol (74 wt. %)
Adiponitrile (10 wt. %)
γ-Undecanolactone (3 wt. %)
Water (3 wt. %)
  Spark voltage: 530 V
  Working period: 5.9 minutes
  Electroconductance: 1.5 mS/cm

EXAMPLE 52

Ammonium 1,6-decanedicarboxylate (5 wt. %)
Ammonium cyclohexanoate (5 wt. %)
Ethylene glycol (77 wt. %)
Adiponitrile (10 wt. %)
Water (3 wt. %)
  Spark voltage: 510 V
  Working period: 5.9 minutes
  Electroconductance: 1.6 mS/cm

EXAMPLE 53

Ammonium 1,6-decanedicarboxylate (5 wt. %)
Ammonium cyclohexanoate (5 wt. %)
Ethylene glycol (74 wt. %)
Adiponitrile (10 wt. %)
γ-Undecanolactone (3 wt. %)
Water (3 wt. %)
  Spark voltage: 520 V
  Working period: 5.9 minutes
  Electroconductance: 1.6 mS/cm Comparisons between the results of Examples 46 to 53 and the results of Comparison Examples 4 to 9 indicate that the electrolytic solutions containing additives of ammonium 1,6-decanedicarboxylate and a monocarboxylic acid having an alkyl chain of 3–7 carbon atoms and one ethyl group at the α-position of the carboxyl group or its salt or a monocarboxylic acid of a cyclic saturated compound having 5 or 6 ring-forming carbon atoms or its salt (optionally further a nitrile compound) according to the invention give an apparently high spark voltage as compared with the electrolytic solutions containing an additive of ammonium 1,6-decanedicarboxylate alone, while almost no changes are observed on the working period and electroconductivity.

UTILIZATION IN INDUSTRY

The electrolytic solutions and electrolytic capacitors of the invention are favorably employable as driving power supplies for air conditioners, refrigerators, microwave ovens, washing machines, illuminators, elevators, robots, NC machine tools, electric trains, solar generators, hybrid motor cars and electric motor cars.

What is claimed is:

1. An electrolytic solution comprising water and a water-miscible organic solvent, which further contains 1,6-decanedicarboxylic acid or a salt thereof and at least one additive selected from the group consisting of a dinitrile compound, pivalic acid or a salt thereof, a diester compound, a lactone compound having an alkyl group, a cyanoalkanoic acid ester, a monocarboxylic acid having an alkyl chain of 3–7 carbon atoms and two alkyl groups of 1–4 carbon atoms at the β-position of the carboxyl group, a salt thereof, a monocarboxylic acid having an alkyl chain of 3–7 carbon atoms and one ethyl group at the α-position of the carboxyl group, a salt thereof, a monocarboxylic acid of a cyclic saturated compound having 5 or 6 ring-forming carbon atoms, and a salt thereof.

2. The electrolytic solution of claim 1, wherein the water-miscible organic solvent is an organic solvent containing ethylene glycol.

3. The electrolytic solution of claim 1, which contains as the additive 0.1 to 50 wt. % of a dinitrile compound comprising an alkylene chain of 1–12 carbon atoms and two nitrile groups attached to the alkylene chain.

4. The electrolytic solution of claim 3, which further contains as the additive 1 to 20 wt. % of pivalic acid or a salt thereof.

5. The electrolytic solution of claim 1, which contains as the additive 1 to 20 wt. % of pivalic acid or a salt thereof.

6. The electrolytic solution of claim 5, in which a weight ratio of pivalic acid or a salt thereof to 1,6-decanedicarboxylic acid or a salt thereof is in the range of 25/75 to 90/10.

7. The electrolytic solution of claim 1, which contains as the additive 0.01 to 50 wt. % of a diester compound having an alkylene group of 2–18 carbon atoms.

8. The electrolytic solution of claim 7, which further contains as the additive 1 to 20 wt. % of pivalic acid or a salt thereof.

9. The electrolytic solution of claim 1, which contains as the additive 0.1 to 50 wt. % of a lactone compound having at least one alkyl group of 1–12 carbon atoms.

10. The electrolytic solution of claim 9, which further contains as the additive 1 to 20 wt. % of pivalic acid or a salt thereof.

11. The electrolytic solution of claim 1, which contains as the additive 0.01 to 50 wt. % of a cyanoalkanoic acid ester having an alkylene group of 2–18 carbon atoms.

12. The electrolytic solution of claim 11, which further contains as the additive 1 to 20 wt. % of pivalic acid or a salt thereof.

13. The electrolytic solution of claim 1, which contains as the additive 0.1 to 50 wt. % of a monocarboxylic acid having an alkyl chain of 3–7 carbon atoms and two alkyl groups of 1–4 carbon atoms at the β-position of the carboxyl group or a salt thereof.

14. The electrolytic solution of claim 13, which further contains as the additive 0.1 to 50 wt. % of a dinitrile compound.

15. The electrolytic solution of claim 1, which contains as the additive a monocarboxylic acid having an alkyl chain of 3–7 carbon atoms and one ethyl group at the α-position of the carboxyl group or a salt thereof, under the condition that a total amount of the monocarboxylic acid or salt and 1,6-decanedicarboxylic acid or a salt thereof is 1 to 20 wt. %.

16. The electrolytic solution of claim 15, which further contains as the additive 0.1 to 50 wt. % of a dinitrile compound.

17. The electrolytic solution of claim 1, which contains as the additive a monocarboxylic acid of a cyclic saturated compound having 5 or 6 ring-forming carbon atoms or a salt thereof, under the condition that a total amount of the monocarboxylic acid or salt and 1,6-decanedicarboxylic acid or a salt thereof is 1 to 20 wt. %.

18. The electrolytic solution of claim 17, which further contains as the additive 0.1 to 50 wt. % of a dinitrile compound.

19. An electrolytic solution comprising water and a water-miscible organic solvent, which further contains a carboxylic acid or a salt thereof and at least one additive selected from the group consisting of a dinitrile compound, a diester compound, a lactone compound having an alkyl group, and a cyanoalkanoic acid ester.

20. The electrolytic solution of claim 19, wherein the water-miscible organic solvent is an organic solvent containing ethylene glycol.

21. The electrolytic solution of claim 19, which contains as the additive 0.1 to 50 wt. % of a dinitrile compound comprising an alkylene chain of 1–12 carbon atoms and two nitrile groups attached to the alkylene chain.

22. The electrolytic solution of claim 19, which contains as the additive 0.01 to 50 wt. % of a diester compound having an alkylene group of 2–18 carbon atoms.

23. The electrolytic solution of claim 19, which contains as the additive 0.1 to 50 wt. % of a lactone compound having at least one alkyl group of 1–12 carbon atoms.

24. The electrolytic solution of claim 19, which contains as the additive 0.01 to 50 wt. % of a cyanoalkanoic acid ester having an alkylene group of 2–18 carbon atoms.

25. An electrolytic capacitor comprising a metallic element having an oxide film on a surface thereof and an electrolytic solution in a sealed case, wherein the electrolytic solution comprises water and a water-miscible organic solvent, which further contains 1,6-decanedicarboxylic acid or a salt thereof and at least one additive selected from the group consisting of a dinitrile compound, pivalic acid or a salt thereof, a diester compound, a lactone compound having an alkyl group, a cyanoalkanoic acid ester, a monocarboxylic acid having an alkyl chain of 3–7 carbon atoms and two alkyl groups of 1–4 carbon atoms at the β-position of the carboxyl group, a salt thereof, a monocarboxylic acid having an alkyl chain of 3–7 carbon atoms and one ethyl group at the α-position of the carboxyl group, a salt thereof, a monocarboxylic acid of a cyclic saturated compound having 5 or 6 ring-forming carbon atoms, and a salt thereof.

26. The electrolytic capacitor of claim 25, wherein the metallic member is an aluminum foil.

27. An electrolytic capacitor comprising a metallic member having an oxide film on a surface thereof and an electrolytic solution in a sealed case, wherein the electrolytic solution comprises water and a water-miscible organic solvent, which further contains a carboxylic acid or a salt thereof and at least one additive selected from the group consisting of a dinitrile compound, a diester compound, a lactone compound having an alkyl group, and a cyanoalkanoic acid ester.

28. The electrolytic capacitor of claim 27, wherein the metallic member is an aluminum foil.

* * * * *